US012401958B2

(12) United States Patent
Dobos et al.

(10) Patent No.: US 12,401,958 B2
(45) Date of Patent: Aug. 26, 2025

(54) MATCHED AND EQUALIZED MICROPHONE OUTPUT OF AUTOMOTIVE MICROPHONE SYSTEMS

(71) Applicant: HARMAN BECKER AUTOMOTIVE SYSTEMS GMBH, Karlsbad-Ittersbach (DE)

(72) Inventors: Viktor Dobos, Budapest (HU); Peter Atilla Kardos, Budapest (HU)

(73) Assignee: HARMAN BECKER AUTOMOTIVE SYSTEMS GMBH, Karlsbad-Ittersbach (DE)

( * ) Notice: Subject to any disclaimer, the term of this patent is extended or adjusted under 35 U.S.C. 154(b) by 138 days.

(21) Appl. No.: 17/790,016

(22) PCT Filed: Dec. 30, 2020

(86) PCT No.: PCT/IB2020/001088

§ 371 (c)(1),
(2) Date: Jun. 29, 2022

(87) PCT Pub. No.: WO2021/136966

PCT Pub. Date: Jul. 8, 2021

(65) Prior Publication Data

US 2023/0037381 A1 Feb. 9, 2023

Related U.S. Application Data

(60) Provisional application No. 62/955,171, filed on Dec. 30, 2019.

(51) Int. Cl.
*H04R 29/00* (2006.01)
*H04R 1/40* (2006.01)
(Continued)

(52) U.S. Cl.
CPC ........... *H04R 29/006* (2013.01); *H04R 1/406* (2013.01); *H04R 3/005* (2013.01); *H04R 3/04* (2013.01); *H04R 2499/13* (2013.01)

(58) Field of Classification Search
CPC .......... H04R 3/005; H04R 1/406; H04R 5/04; H04R 2420/05; H04R 2499/11;
(Continued)

(56) References Cited

U.S. PATENT DOCUMENTS

| | | | | |
|---|---|---|---|---|
| 2002/0072816 A1* | 6/2002 | Shdema | .............. H04L 12/2805 | 381/77 |
| 2003/0069727 A1* | 4/2003 | Krasny | .................. G10L 15/20 | 704/228 |

(Continued)

FOREIGN PATENT DOCUMENTS

| | | |
|---|---|---|
| CN | 103220597 A | 7/2013 |
| CN | 109743659 A | 5/2019 |

(Continued)

OTHER PUBLICATIONS

Buck M et al.: "Self-calibrating microphone arrays for speech signal acquisition: A systematic approach", Signal Processing, Elsevier Science Publishers B.V. Amsterdam, NL, vol. 86, No. 6, Jun. 1, 2006, pp. 1230-1238.

*Primary Examiner* — Lun-See Lao
(74) *Attorney, Agent, or Firm* — Brooks Kushman, P.C.

(57) ABSTRACT

A vehicle microphone system may include at least two microphones forming a microphone array, at least one loudspeaker configured to emit audio signals. a processor coupled to a memory and programmed to receive incoming audio signals from the microphone array, determine at least one parameter for each channel of the microphone array, determine at least one filter to apply to at least one channel
(Continued)

based on a difference between the parameters of each channel, and store the at least one filter in the memory.

17 Claims, 4 Drawing Sheets

(51) Int. Cl.
*H04R 3/00* (2006.01)
*H04R 3/04* (2006.01)

(58) Field of Classification Search
CPC ............ H04R 2420/07; H04R 2499/13; H04R 2410/01; H04R 3/00; H04R 5/027; H04R 3/04; H04R 1/08; H04R 1/1083; H04R 1/32; H04R 2225/43; H04R 2430/03; H04R 2430/20; H04R 2430/21; H04R 2460/01; H04R 25/43; H04R 1/403; H04R 2499/15; H04R 29/006; H04R 3/12; H04M 9/082; H04M 1/6016; H04M 1/6066; H04M 9/08; H04M 1/271; H04M 1/6033; H04M 3/002; G10L 21/0208; G10L 2021/02082; G10L 15/20; G10L 2021/02168; G10L 21/0232; G10L 2021/02161; G10L 21/0216; G10L 21/0272; G10L 2025/783; G10L 21/0224; G10L 21/0264; G10L 15/02; G10L 15/142; G10L 15/16; G10L 2015/088; G10L 25/30; H04S 1/005; H04S 3/004; H04S 7/30; H04S 7/301; H04S 2400/11; H04S 2400/15; H04S 2420/11; H04S 7/303; H04S 7/304; H04S 7/307; H04B 3/23; G10K 11/178; G10K 11/17853; G10K 2210/505; G10K 11/17823; G10K 11/17837; G10K 11/17881; G10K 2210/1081; G10K 2210/111; G10H 1/361; G10H 2210/056; G10H 2250/055; G06F 3/012; G06N 3/08; H03G 3/32; H03G 9/005; H03G 9/025
USPC ........................ 381/86, 92, 104–107; 700/94
See application file for complete search history.

(56) References Cited

U.S. PATENT DOCUMENTS

| | | | |
|---|---|---|---|
| 2006/0222184 A1 | 10/2006 | Buck et al. | |
| 2011/0064232 A1 | 3/2011 | Ruwisch | |
| 2015/0030164 A1 | 1/2015 | Ranieri et al. | |
| 2020/0372891 A1* | 11/2020 | Bou Daher | G10L 21/0232 |
| 2020/0381009 A1* | 12/2020 | Penniman | G10L 21/0208 |
| 2021/0098015 A1* | 4/2021 | Pandey | H04R 1/406 |

FOREIGN PATENT DOCUMENTS

| | | |
|---|---|---|
| JP | 2002099297 A | 4/2002 |
| JP | 2007129373 A | 5/2007 |

* cited by examiner

MATCHED AND EQUALIZED MICROPHONE OUTPUT OF AUTOMOTIVE MICROPHONE SYSTEMS

CROSS-REFERENCE TO RELATED APPLICATIONS

This application is the U.S. National Phase of PCT Application No. PCT/IB2020/001088 filed on Dec. 30, 2020, which claims the benefit of U.S. provisional application Ser. No. 62/955,171 filed Dec. 30, 2019, the disclosure disclosures of which is hereby are hereby incorporated in its in their entirety by reference herein.

TECHNICAL FIELD

The present disclosure relates to a matched and equalized microphone output of the automotive microphone systems.

BACKGROUND

Vehicles are including more and more sophisticated infotainment systems. These infotainment systems include various loudspeakers, displays, etc. Current vehicle cabin acoustics use various signal processing techniques to increase the user experience and audio quality. Such audio processing depends on input signals from in-vehicle microphones.

SUMMARY

A vehicle microphone system may include at least two microphones forming a microphone array, at least one loudspeaker configured to emit audio signals. a processor coupled to a memory and programmed to receive incoming audio signals from the microphone array, determine at least one parameter for each channel of the microphone array, determine at least one filter to apply to at least one channel based on a difference between the parameters of each channel, and store the at least one filter in the memory.

A method for decreasing the differences between microphone parameters within a vehicle microphone system may include receiving incoming audio signals from a vehicle microphone array, determining at least one parameter for each channel of the microphone array, determining at least one filter to apply to at least one channel based on a difference between the parameters of each channel, storing the at least one filter in a memory.

A non-transitory computer-readable medium including instructions for decreasing the differences between microphone parameters within a vehicle microphone system, comprising: receiving incoming audio signals from a vehicle microphone array, determining at least one parameter for each channel of the microphone array, determining at least one filter to apply to at least one channel based on a difference between the parameters of each channel, and storing the at least one filter in a memory.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Microphone arrays are more and more popular in automotive applications due to their superior performance in signal enhancement and noise suppression. The arrays may be used to create user satisfaction with vehicle audio systems. For example, the microphone arrays my aid in noise canceling functionality, directed sound experience, etc. However, as there are multiple microphone elements in an array, parameter mismatch across elements is often a concern for achieving optimal acoustical army performance. Usual microphone matching by micro-electromechanical system (MEMS) microphone design is +−1 dB at 1 kHz. To be able to use more advanced algorithms, the elements have to match even better on full audio range (20 kHz-20 kHz) and not just on 1 kHz. Such mismatch may decrease the effectiveness of certain audio processing features within the audio system.

Disclosed herein is an automotive microphone system design, it contains a signal processing unit (e.g. CPU, DSP, FPGA), which can equalize and perform signal processing/filtering inside the microphone module. By this processing, the microphone system output channels are equalized/matched. The described setup can be used as well for single element microphones for equalizing the response. It may be used with analog and digital microphones.

The manufacturing of the described microphone system may require an end of line test setup where the microphones frequency response is measured, and based on this measured frequency response, the processing unit is set in a microphone module or processor.

Step by step processes at end of line test setup:

Preprogram microphone system with a bypassed signal processing unit.

Measure the Microphone module all channels frequency response and phase.

Calculating the required filters for each microphone channel.

Reprogram microphone module signal processing unit with the calculated filters.

Remeasure the Microphone module all channels frequency response and phase.

Figure 1:
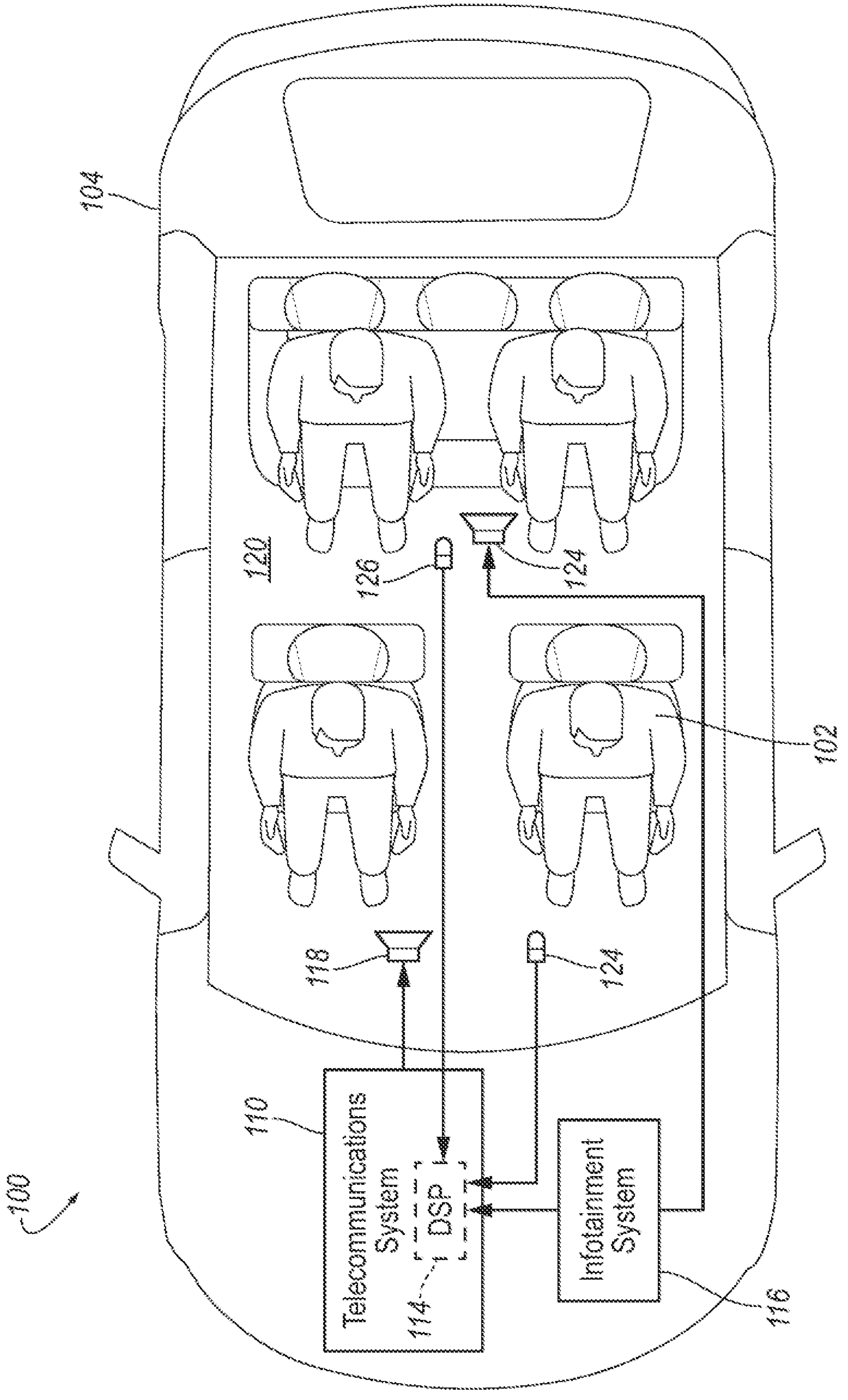
FIG. 1 illustrates an example block diagram for an automotive microphone system.

FIG. 1 illustrates an example block diagram for an automotive microphone system 100 of a vehicle 104. The microphone system 100 may include a telecommunications system 110 for processing incoming and outgoing telecommunications signals, collectively shown as telecommunications signals 112 in FIG. 1. The telecommunications system 110 may include a digital signal processor (DSP) 114 for processing audio telecommunications signals, as will be described in greater detail below. According to another embodiment, the DSP 114 may be a separate module from the telecommunications system 110. A vehicle infotainment system 116 may be connected to the telecommunications system 110.

A first transducer 118 or speaker may transmit the incoming telecommunications signal to the near-end participant of a telecommunications exchange inside a vehicle cabin 120. Accordingly, the first transducer 118 may be located adjacent to a near-end participant or may generate a sound field localized at a particular seat location occupied by the near-end participant. A second transducer 122 may also transmit audio from the vehicle's infotainment system 116 (e.g., music, sound effects, and dialog from a film audio). The transducers 118, 122 may also emit test signals or audio signals as instructed by the DSP 114 for audio system calibration, testing, and refining.

At least one first microphone array 124 may be located in the vehicle cabin 120 to receive sounds from inside the vehicle cabin 120. The sounds may include ambient noise such as road or wind noise, audio transmitted from the transducers 118, 122, speech of the near-end participant (i.e., driver or another occupant of the source vehicle), etc. The microphone array may include more than one microphone array. In the example shown in FIG. 1, two microphone arrays 124*a*, 124*b* may be included and more than two arrays 124 may be implemented. Signals from the microphone arrays 124 may be used for signal processing to increase sound quality of the transducers 118, 122.

FIGS. 2-5 illustrate block diagrams of microphone systems.

Figure 2:
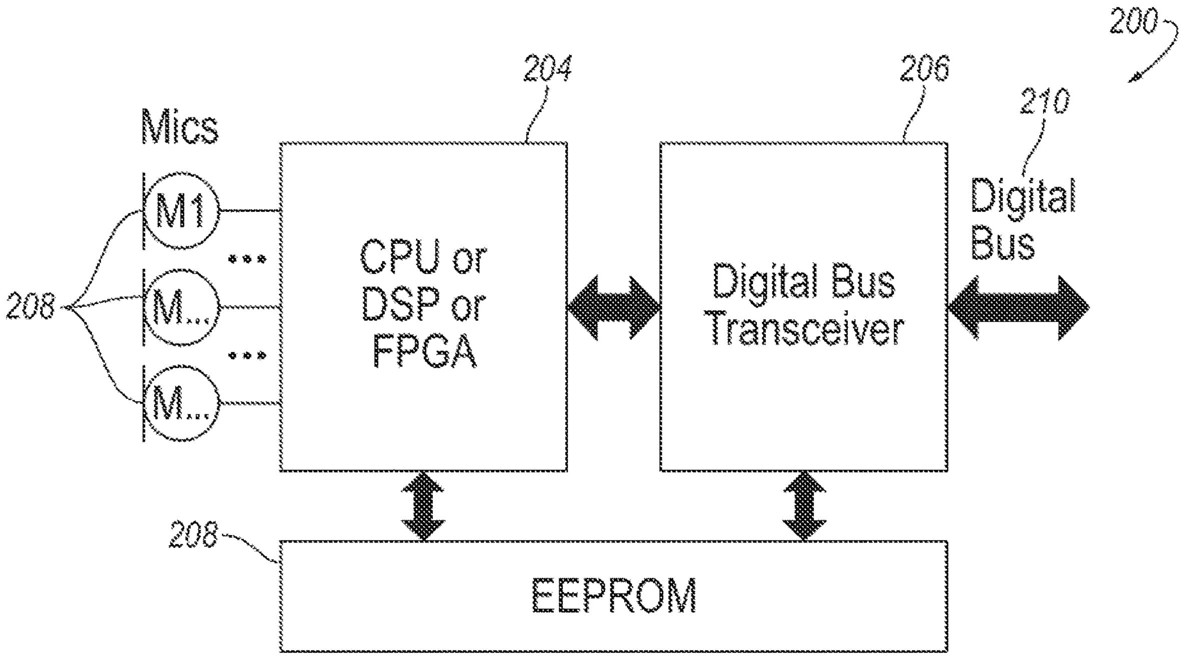
FIG. 2 illustrates an example block diagram of a microphone system.

FIG. 2 illustrates an example block diagram of a microphone system 200. The microphone system 200 may include a microphone array 124 having a plurality of digital microphones 202. The microphones 202 may be directional microphones, omnidirectional microphones, or a combination of both. The microphones 202 may be digital microphones, as is the example in FIG. 2, or the microphones 202 may be analog microphones. The microphones 202 may transmit audio signals to a processor 204. The processor 204 may be separate or include the DSP 114 as illustrated in FIG. 1. The processor may also be a separate central processing unit (CPU), DSP, and/or field-programmable gate array (FPGA). Further, the DSP 114 of FIG. 1 may include the processor 204, digital bus transceiver 206 and EEPROM 208.

The processor 204 may transmit the audio signal to the digital bus transceiver 206 which in turn produces a digital signal. The digital bus transceiver 206 may be configured to receive and transmit the audio signal to a digital data bus 210. The digital data bus 210 may then be configured to provide signals back to the DSP 114 for further audio processing and to enhance sound quality from the loudspeakers 118.

The EEPROM 208, also referred to herein as memory 208, may be configured to provide filtering and filter parameters and may be in communication with the processor 204 and digital bus transceiver 206. That is, the microphone element may be analog and/or digital mic elements. The signal processor unit may be either a CPU or DSP or FPGA signal processor, etc. The outputs may be either analog or digital. EEPROM 208 may be used for the filter configuration, and may be integrated in the signal processor 204 as well. This is described in more detail below. While the memory 208 is described specifically as an EEPROM, other non-volatile memory may be used and implemented.

Figure 3:
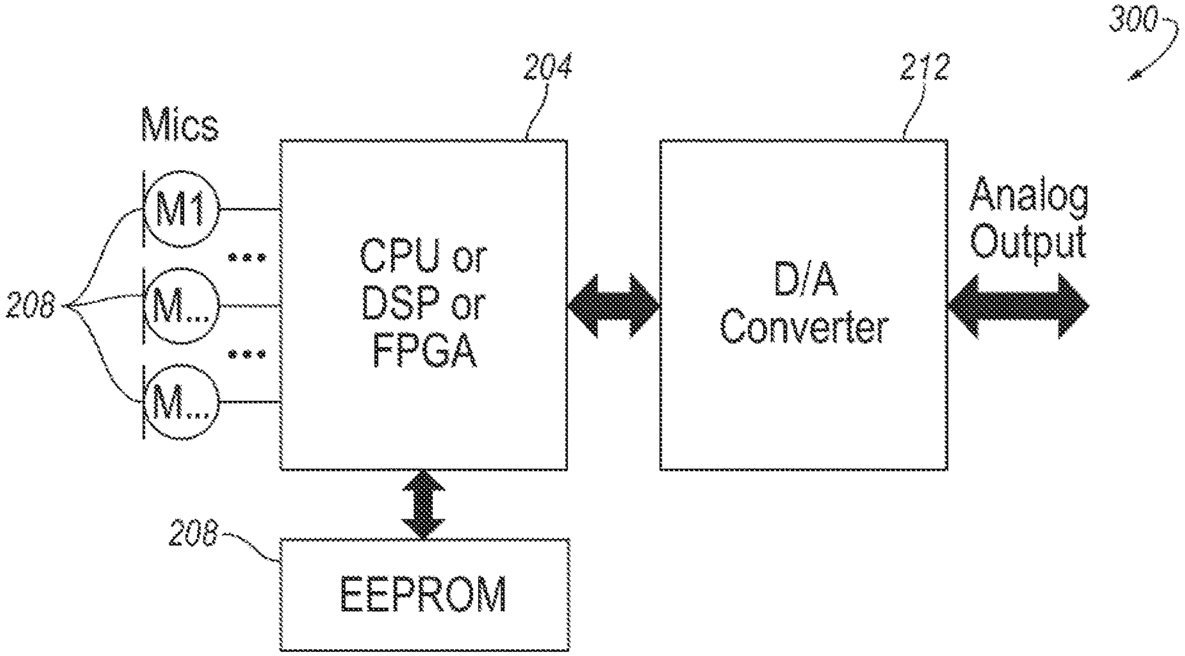
FIG. 3 illustrates an example block diagram of another microphone system.

The microphone array 126 may receive audio signals across multiple microphone channels. These channels may receive signals having various parameters, characteristics, etc. These parameters may include a frequency response, including magnitude and phase. When the microphone channel parameters do not align, the signal processing of the audio system may not perform optimally. Thus, creating filters for each channel to prevent the mismatch of the FIG. 3 illustrates another example block diagram of a microphone system 300.

Similar to FIG. 2, the microphone system 300 may include a microphone array 124 having a plurality of digital microphones 202 configured to transmit audio signals to the processor 204. The processor 204 may transmit the signal to a digital-to-analog converter 212, which may in turn may convert the digital signal from the microphones 202 to an analog output. An EEPROM 208 may be configured to provide filtering and may be in communication with the processor 204.

Figure 4:
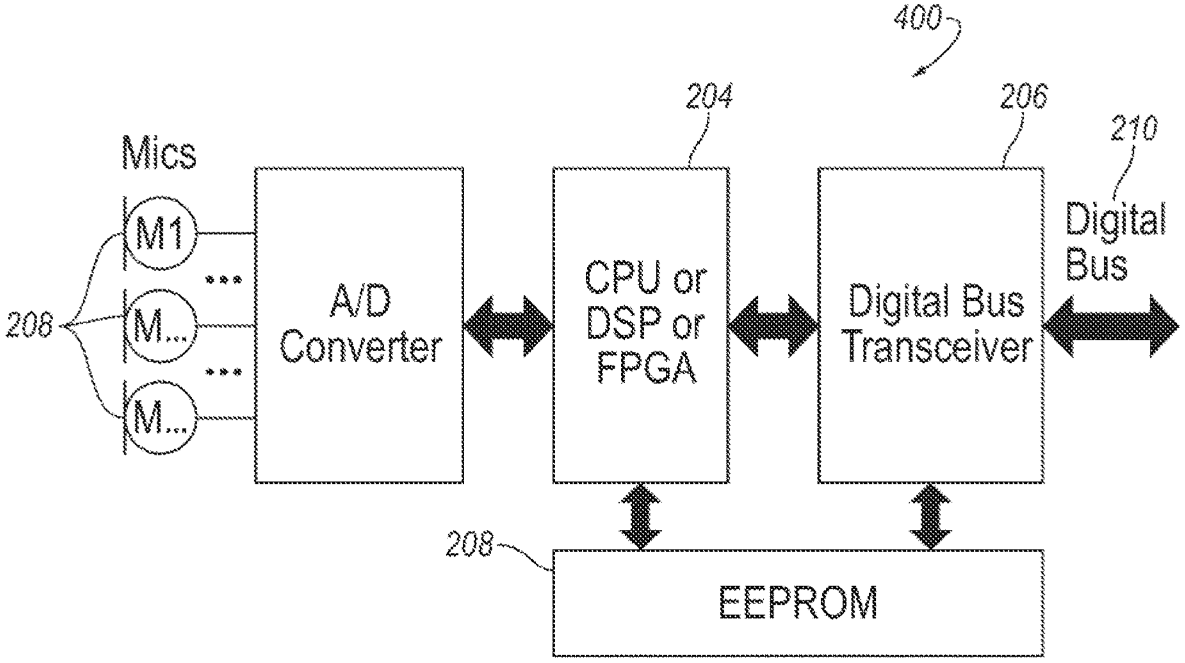
FIG. 4 illustrates an example block diagram of another microphone system.

FIG. 4 illustrates another example block diagram of a microphone system 400. A plurality of analog microphones 214 may transmit analog signals to an analog-to-digital converter 216. The converter 216 may convert the analog signals received from the microphones 214 to digital signals. The digital signals from the converter 216 may then be transmitted to the processor 204. Similar to the example in FIG. 2, the processor 204 may transmit the signal to a digital bus transceiver 206 which in turn produces a digital signal. The EEPROM 208 may be configured to provide filtering and may be in communication with the processor 204 and digital bus transceiver 206.

Figure 5:
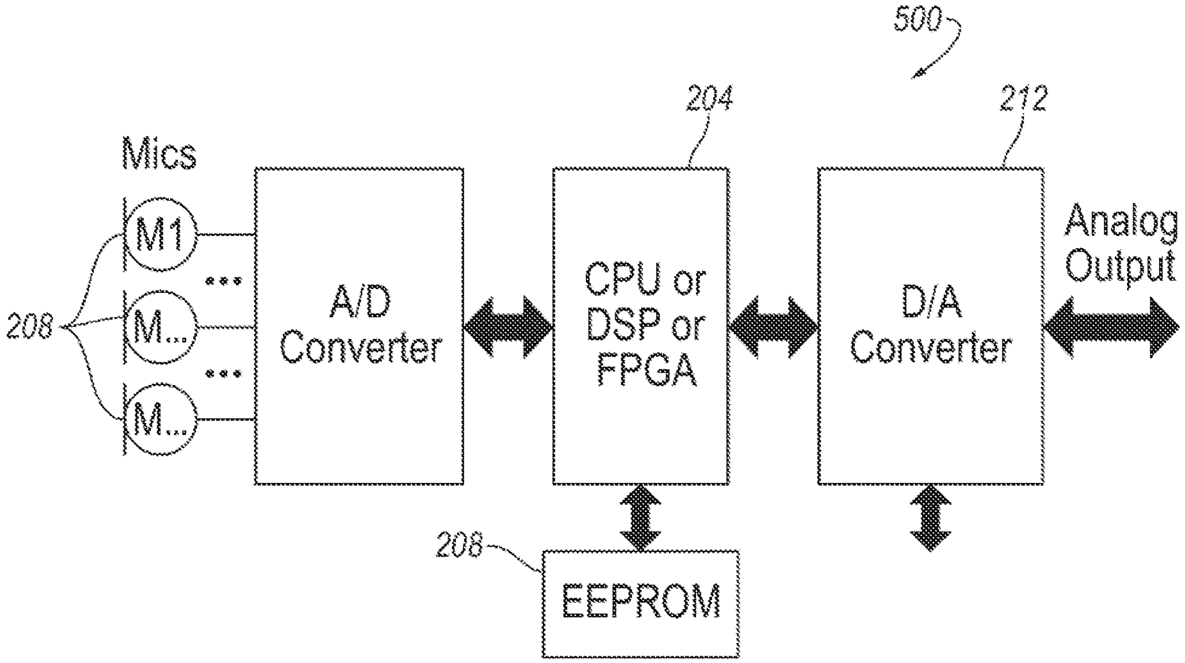
FIG. 5 illustrates an example block diagram of another microphone system.

FIG. 5 illustrates another example block diagram of a microphone system 500. Similar to FIG. 4, a plurality of analog microphones 214 may transmit analog signals to the analog-to-digital converter 216. The digital signals from the converter 216 may then be transmitted to the processor 204. Similar to the example in FIG. 2, the processor 204 may transmit the signal to the digital-to-analog converter 212 to produces an analog signal. The EEPROM 208 may be configured to provide filtering and may be in communication with the processor 204.

Figure 6:
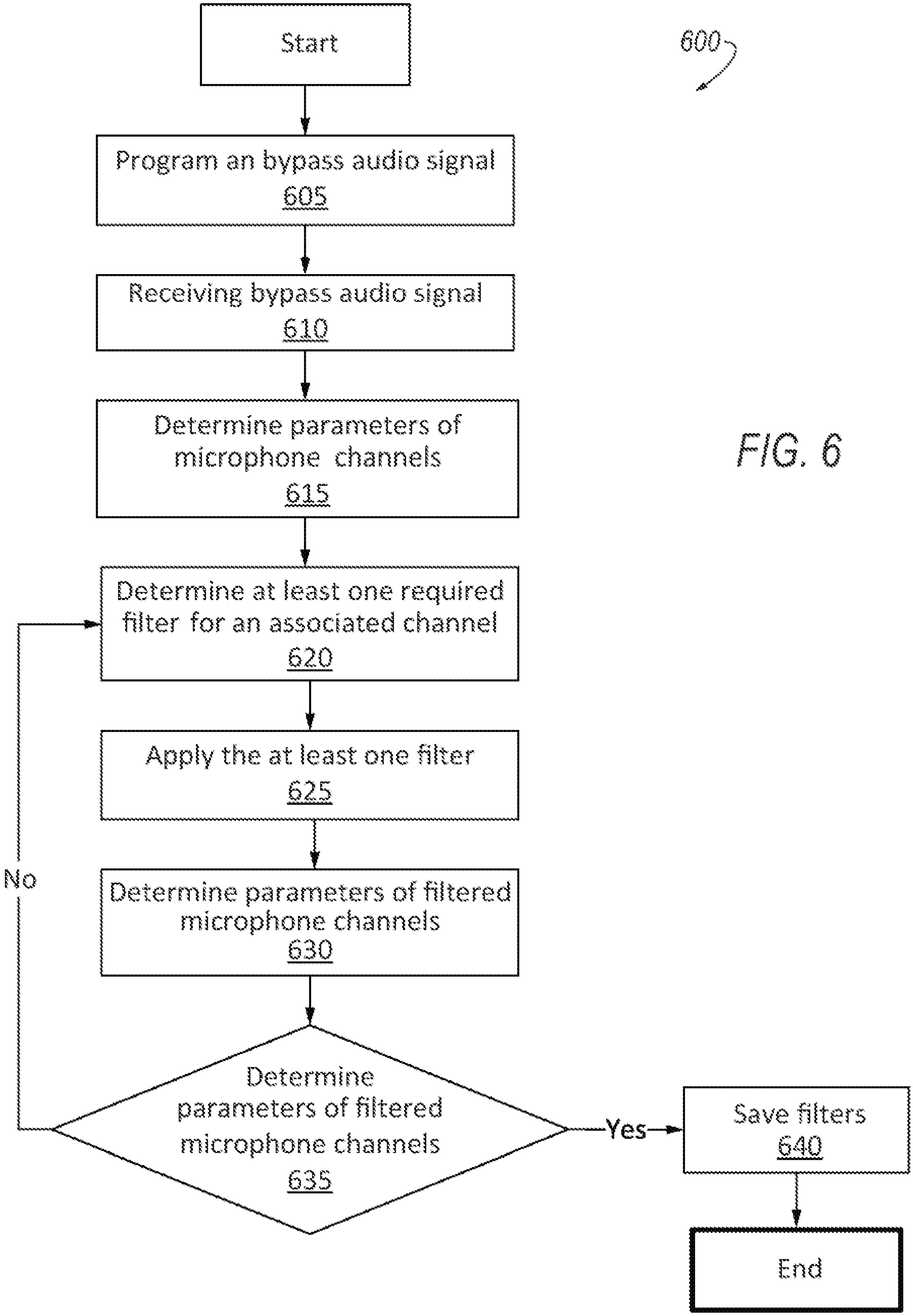
FIG. 6 illustrates an example flow chart for a process of the microphone system.

FIG. 6 illustrates an example flow chart of a process 600 for the microphone system 100. The process 600 may be carried out by the DSP 114, the processor 204, or another general or special purpose processor. The process 600 may begin at block 605 where the processor 204 may program an audio byspass signal to be emitted at the loudspeakers 118, 122.

At block 610, the processor 204 may receive audio signals from the microphone array 126. The audio signal may include digital signals from each digital microphone 202 based on the bypass signal.

At block 615, the processor 204 may determine the parameters, including the frequency response and phase, of each microphone channel of the microphone array 124.

At block 620, the processor 204 may determine the required filters for each microphone channel. The filters may be determined for each specific channel based on the difference or mismatch between the frequency responses and phases of each channel.

At block 625, the processor 204 may apply the filters to the respective microphone channels. The memory 208 may maintain these filters and apply the filters upon receiving the audio signals from the microphone array 124. The filters may bring the specific frequency responses and phases of the microphone channels more in line with one another. For example, instead of a typical M EMS design, which matches at plus or minus 1 dB at 1 kHz, the filters may bring the channels to match on a full audio range (e.g., 20 Hz-20 kHz) and not just at 1 kHz. The filters aid in equalizing the microphone array 124 for better signal processing, which may lead to more optimal acoustic performance, noise cancelation, etc.

At block 630, the processor 204 may determine the parameters, including the frequency response and phase of each microphone channel of the microphone army 124 with the filters applied. That is, the processor 204 may remeasure the signals and determine the efficacy of the filters and determine whether the microphone channels are equalized or matched.

At block 635, the processor 204 may remeasure and determine whether the parameters of the microphone channels are equalized. This may be done by comparing the parameters of the channels and determining whether the frequency responses of the channels are within a certain threshold of each other. That is, the processor 204 may determine whether one microphone channel's magnitude and/or phase is within a certain threshold difference with another microphone channel.

If the channel parameters are within a certain threshold of one another, the process 600 proceeds to block 640. If not, the process 600 proceeds to block 620 to further refine the filters for each channel. At block 640, the processor 204 may save the filters in the memory 208 for future application.

Accordingly, a vehicle microphone system is disclosed herein which equalizes and aligns the channel parameters of the microphone array. This is achieved by applying certain filters to certain channels based in a frequency response of a bypass signal on each channel. The microphone array may include digital or analog microphones, and their outputs may be either analog or digital. While the system is described as being used for automotive applications, other applications, such as home theatre, surround sound, etc., may also enjoy the benefits of the system and reference to vehicles is not intended to be limiting. The processes described herein may be an end of the line process for microphone arrays. This may be accomplished at the testing, or possibly even the installation stage. By applying filters at the processor 204, the microphone array 124 may be continually updated with additional filters or filter parameters.

Any one or more of the controllers and processors or devices described herein include computer executable instructions that may be compiled or interpreted from computer programs created using a variety of programming languages and/or technologies. In general, a processor (such as a microprocessor) receives instructions, for example from a memory, a computer-readable medium, or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semiconductor storage device, or any suitable combination thereof.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention

What is claimed is:

1. A vehicle microphone system, comprising:
at least two microphones forming a microphone array;
at least one loudspeaker configured to emit audio signals;
a processor coupled to a memory and programmed to:
receive incoming audio signals from the microphone array;
determine at least one parameter for each channel of the microphone array;
determine at least one filter to apply to at least one channel based on a difference between at least one the parameter for each channel, wherein the at least one filter is configured to adjust the at least one parameter of an associated channel to decrease the difference between the at least one parameter for each channel; and
store the at least one filter in the memory.

2. The system of claim 1, wherein the at least one parameter includes a frequency response for each channel.

3. The system of claim 1, wherein the at least one parameter includes a phase for each channel.

4. The system of claim 1, wherein the at least one parameter includes a frequency or phase of the associated channel.

5. The system of claim 1, wherein the processor is further programmed to remeasure the at least one parameter of a subsequent audio signal after application of the at least one filter and adjust the at least one filter based on the difference between the at least one parameter of the subsequent audio signal and the parameters for each of the other channels.

6. The system of claim 1, wherein the microphone array includes a plurality of digital microphones.

7. The system of claim 1, wherein the microphone array includes a plurality of analog microphones.

8. A method for decreasing differences between microphone parameters within a vehicle microphone system, comprising:
receiving incoming audio signals from a vehicle microphone array;
determining at least one parameter for each channel of the microphone array;
determining at least one filter to apply to at least one of the channels to adjust the at least one parameter of an associated channel based on a difference between the at least one parameter of each channel; and
storing the at least one filter in a memory.

9. The method of claim 8, wherein the at least one parameter includes a frequency response for each channel.

10. The method of claim 8, wherein the at least one parameter includes a phase for each channel.

11. The method of claim 8, wherein the at least one parameter includes a frequency or phase of the associated channel.

12. The method of claim 8, further comprising remeasuring the at least one parameter of a subsequent audio signal after application of the at least one filter and adjust the at least one filter based on the difference between the at least one parameter of the subsequent audio signal and the parameters for each of the other channels.

13. The method of claim 8, wherein the microphone array includes a plurality of digital microphones.

14. The method of claim 8, wherein the microphone array includes a plurality of analog microphones.

15. A non-transitory computer-readable medium including instructions for decreasing the differences between microphone parameters within a vehicle microphone system, comprising:

receiving incoming audio signals from a vehicle microphone array;

determining at least one parameter for each channel of the microphone array;

determining at least one filter to apply to at least one channel to adjust the at least one parameter of an associated channel based on a difference between the at least one parameter of each channel; and storing the at least one filter in a memory.

16. The method of claim 15, wherein the at least one parameter includes a frequency response fix each channel.

17. The method of claim 15, wherein the at least one parameter includes a phase for each channel.

* * * * *